United States Patent
Giuntini et al.

(10) Patent No.: US 9,236,768 B2
(45) Date of Patent: Jan. 12, 2016

(54) SYSTEMS, METHODS, AND DEVICES FOR CONTROL OF PARALLEL UNINTERRUPTIBLE POWER SUPPLIES

(76) Inventors: Lorenzo Giuntini, Ticino (CH); Silvio Colombi, Ticino (CH); Andrea Lauro Delmué, Ticino (CH)

(*) Notice: Subject to any disclaimer, the term of this patent is extended or adjusted under 35 U.S.C. 154(b) by 1018 days.

(21) Appl. No.: 13/363,182

(22) Filed: Jan. 31, 2012

(65) Prior Publication Data

US 2013/0193761 A1    Aug. 1, 2013

(51) Int. Cl.
*H02J 9/00* (2006.01)
*H02J 9/06* (2006.01)
*H02J 3/46* (2006.01)

(52) U.S. Cl.
CPC . *H02J 9/062* (2013.01); *H02J 3/46* (2013.01); *Y10T 307/615* (2015.04)

(58) Field of Classification Search
CPC ......... H02J 9/062; H02J 3/46; Y10T 307/615
See application file for complete search history.

(56) References Cited

U.S. PATENT DOCUMENTS

| | | | |
|---|---|---|---|
| 4,133,018 A | 1/1979 | Terunuma et al. | |
| 4,475,150 A | 10/1984 | D'Atre et al. | |
| 4,600,917 A | 7/1986 | Seki et al. | |
| 4,882,782 A | 11/1989 | Kimizuka et al. | |
| 5,629,571 A | 5/1997 | Roudeski | |
| 6,556,459 B2 | 4/2003 | Okui et al. | |
| 7,372,177 B2 | 5/2008 | Colombi et al. | |
| 7,400,066 B2 * | 7/2008 | Tassitino, Jr. ........... | H02J 9/062 307/46 |
| 7,679,217 B2 | 3/2010 | Dishman et al. | |
| 2003/0048006 A1 * | 3/2003 | Shelter, Jr. .............. | H02J 9/061 307/64 |
| 2010/0042344 A1 * | 2/2010 | Heber ..................... | G01R 31/40 702/58 |
| 2013/0099566 A1 * | 4/2013 | Pfitzer ..................... | H02J 3/14 307/29 |

OTHER PUBLICATIONS http://powerquality.eaton.com/About-Us/News-Events/2009/PR051009.asp; Date: Oct. 5, 2009 Eaton's Energy Saver System Enables UPSs to Deliver Industry-leading Efficiency without Compromising Reliability.

* cited by examiner

*Primary Examiner* — Daniel Cavallari
(74) *Attorney, Agent, or Firm* — Fletcher Yoder, P.C.

(57) ABSTRACT

Systems, methods, and devices for controlling parallel uninterruptible power supplies (UPSs) are provided. One example of a parallel UPS system may include several UPS modules to supply power to a load and at least one controller. At least some of the UPS modules may include a bypass feed path that can be switched on or off via a static switch module (SSM). The controller may adaptively control which of the bypass feed paths are switched on and off based on the load and respective capacity ratings of the UPS modules. The controller may also determine when an SSM of one of the bypass feed paths is likely to have failed.

24 Claims, 9 Drawing Sheets

SYSTEMS, METHODS, AND DEVICES FOR CONTROL OF PARALLEL UNINTERRUPTIBLE POWER SUPPLIES

BACKGROUND OF THE INVENTION

The presently disclosed subject matter relates to control of uninterruptible power supplies (UPSs).

An uninterruptible power supply (UPS) is an electrical device that can supply power to a load despite variations in quality and/or availability of utility-based power. One common type of UPS is a double-conversion UPS. A double-conversion UPS receives power from a power source (typically a utility power grid), converts the power from alternating current (AC) to direct current (DC) in a rectifier, and stores at least some of this power in an energy storage device. An inverter changes the DC power from the rectifier and/or the energy storage device into an AC power waveform. The AC power waveform may be supplied to the load.

Because multiple-conversion operation can be relatively inefficient, many UPS devices can operate in an alternative mode to improve efficiency. In one power-saving mode, power to the load may be supplied primarily through a bypass feed path from the utility or other power source to the load. A static switch module (SSM) typically switches the bypass feed path on or off. When several UPSs are connected to the load in parallel, the load sharing during bypass operation may not be actively controlled and thus may be heavily dependent on differences in impedance due to external cable lengths. Under such conditions, the SSMs or other devices of the bypass feed paths may fail open or fail short with no visible effect on the output voltage.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a parallel UPS system may include several UPS modules to supply power to a load and at least one controller. At least some of the UPS modules may include a bypass feed path that can be switched on or off via a static switch module (SSM). The controller may adaptively control which of the bypass feed paths are switched on and off based on the load and respective capacity ratings of the UPS modules. The controller may also determine when an SSM of one of the bypass feed paths is likely to have failed.

In a second embodiment, a parallel uninterruptible power supply (UPS) system controller includes a memory and data processing circuitry. The memory may store electrical measurements associated with several UPS modules connected in parallel to supply power to a load. At least some of the UPS modules may include a bypass feed path that can be switched on or off via a static switch module (SSM). The data processing circuitry may execute an adaptive capacity control component of a parallel UPS control system and an SSM failure detection component of the parallel UPS control system. The adaptive capacity control component may adaptively control which of the plurality of bypass feed paths are switched on and off based at least in part on the load and respective capacity ratings of the UPS modules. The SSM failure detection component may determine when an SSM of one of the bypass feed paths is likely to have failed based on a measurement of current through the one of the bypass feed paths.

In a third embodiment, an article of manufacture includes one or more tangible, machine-readable media at least collectively comprising machine-executable instructions. These instructions may include instructions to receive measurements of current through a bypass feed path of an uninterruptible power supply (UPS) and instructions to use the measurements to take certain actions depending on whether a static switch module (SSM) of the bypass feed path is supposed to be on or off. For instance, when the SSM is supposed to be off, the instructions may determine a root mean square (RMS) value of the current through the bypass feed path based at least in part on the measurements of current through the bypass feed path and determine whether a short-circuit failure condition of the SSM is likely to have occurred based at least in part on the RMS current value. Similarly, when the SSM of the bypass feed path is supposed to be on, the instructions may determine a direct current value of the current through the bypass feed path based at least in part on the measurements of current through the bypass feed path and determine whether an open-circuit failure condition of the SSM is likely to have occurred based at least in part on the direct current value.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
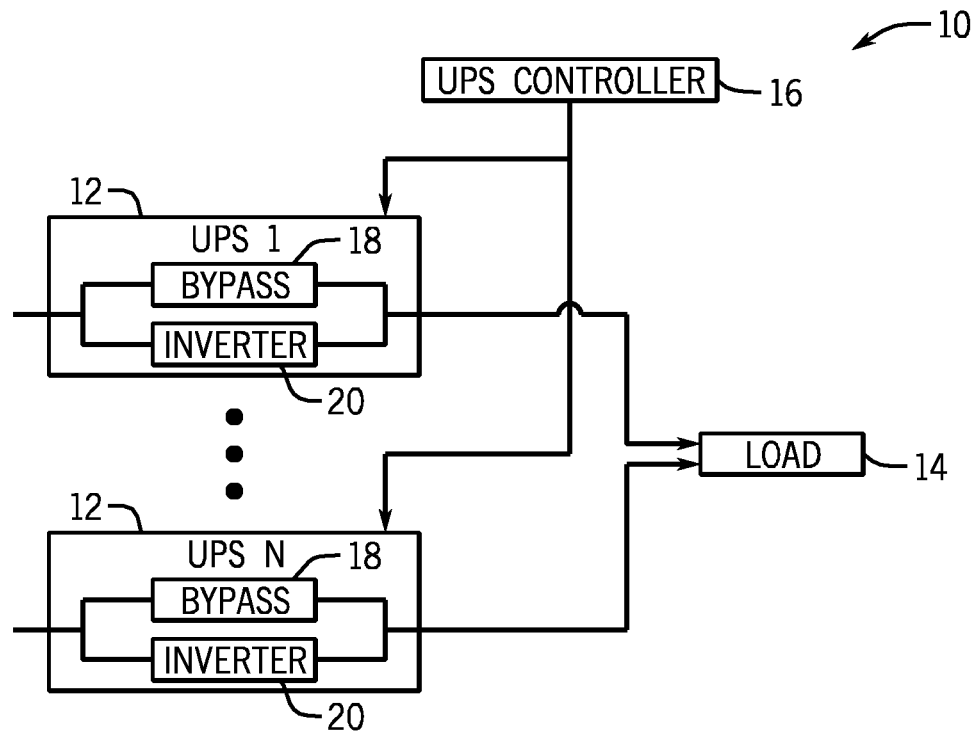
FIG. 1 is a block diagram of a parallel uninterruptable power supply (UPS) system, in accordance with an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure relates to controlling at least one uninterruptible power supply (UPS) in a parallel UPS system. Specifically, the present disclosure will describe a control system that provides both adaptive capacity control—allowing certain UPS modules to be cycled on or off to improve efficiency—as well as a manner of determining when a thyristor of a static switch module (SSM) of a UPS has failed. As mentioned above, a UPS may provide power to a load while protecting the load from power supply disturbances. A multimode UPS can operate in more than one mode. Typically, at least one load will provide more certain protection and at least one mode will provide more efficiency. For example, in a double-conversion mode, alternating current (AC) power is first converted to direct current (DC) power. This DC power then may be reconverted back to AC power by an inverter. The double-conversion of power generally may take place in an inverter feed path, which may provide excellent load protection but limited efficiencies. In a more efficient mode (e.g., an "eco-mode"), power may be provided through a bypass feed path unless power supply disturbance occur. When a power supply disturbance occurs, power then may be provided through the inverter feed path. By providing power through the bypass feed path, the UPS may provide greater efficiency, but may offer less certain protection.

When several multimode UPSs are connected in parallel, the present disclosure teaches a manner of adaptive capacity control and error detection. Adaptive capacity control may allow the number of bypass feed paths to be variably switched on or off depending on the rated capacity of the UPS that includes the bypass feed path and the total amount of the load. Efficiency may be improved because fewer UPS modules may need to be switched on at any given time using adaptive capacity control. Additionally, by cycling through the UPS modules rather than simply sharing the load among the UPS modules, the lifetimes of thyristors in static switch modules (SSMs) may be extended.

Using adaptive capacity control to cycle which bypass feed paths are on or off may provide a robust opportunity to detect thyristor failures in static switch modules (SSMs). Specifically, as will be described below, a bypass feed path generally may be switched on or off using an SSM. Each SSM may include two thyristors per phase in antiparallel connection, or a total of six thyristors for a three-phase system. Without the benefit of the present disclosure, an SSM may fail open or shorted with no visible effect on the output voltage in a parallel configuration, since load sharing during bypass operation of a parallel UPS system is not usually actively controlled.

The share of the load during bypass operation in a parallel UPS system may be heavily dependent on external cable lengths that affect the impedance of each UPS output to the load. Nevertheless, the present disclosure teaches various manners of detecting thyristor failures. In one example, the influence of the external cable lengths on load sharing may be reduced by inserting an inductor, or choke, into bypass feed paths. The inductor or choke may be more likely to expose a failure that may occur in a thyristor of an SSM. Moreover, adaptive capacity control may allow bypass feed paths to be cycled on and off, allowing electrical measurements of the SSMs of the bypass feed paths to more clearly allow failures to be identified.

One example of a parallel UPS system 10 that can carry out these operations appears in FIG. 1. The parallel UPS system 10 includes any suitable number of uninterruptible power supplies (UPSs) 12, here labeled 1 . . . N, which may feed power to a load 14. One or more UPS controllers 16 may control the operation of the UPSs 12 in the manner described below. Although the example of FIG. 1 illustrates a single UPS controller 16 that may control all of the UPSs 12 of the parallel UPS system 10, other configurations may be employed. For example, each UPS 12 may rely on its own UPS controller 16, which may coordinate with other UPS controllers 16 in any suitable fashion (e.g., peer-to-peer or master-slave).

Among other things, the UPS controller 16 may determine and control when each UPS 12 supplies power to the load 14 by way of a bypass feed path 18 or an inverter feed path 20. The bypass feed path 18 of each UPS 12 represents power supplied from some main power source, such as a power utility or local generator. In contrast, the inverter feed path 20 represents a double-conversion path in which alternating current (AC) power is first converted to direct current (DC) before being converted again to AC power using an inverter. In the example of FIG. 1, the inverter feed path 20 receives power from the same source as the bypass feed path 18. It should be appreciated, however, that the inverter feed path 20 may alternatively receive input power from a different power source. For instance, the bypass feed path 18 may receive power from a utility power grid and the inverter feed path 20 may receive power from a local generator. The inverter feed path 20 will generally provide a higher-quality source of power that is resistant to disturbances from the power grid. Supplying power through the inverter feed path 20, however, will introduce some inefficiencies due to power conversion. As such, supplying power through the inverter feed path 20 may be less efficient than supplying power through the bypass feed path 18.

The UPS controller 16 may employ any suitable control technique to determine when to supply power primarily via the bypass feed paths 18 and when to supply power via the inverter feed paths 20. Since the bypass feed path 18 is generally more efficient, the UPS controller 16 may control the bypass feed path 18 to supply power to the load 14 as a default. Thereafter, when certain power supply disturbances occur, the UPS controller 16 may cause at once all of the UPSs 12 to transition from supplying power via bypass feed paths 18 to supplying power via inverter feed paths 20.

When the UPS 12 supplies power to the load 14 via the bypass feed paths 18, fewer than all of the bypass feed paths 18 may be employed, if possible. That is, the UPS controller 16 may employ adaptive capacity control to determine a suitable number of bypass feed paths 18 with which to supply the load 14. As such, adaptive capacity control may enable certain of the bypass feed paths 18 to be switched off. Doing so may extend the life of the components of these bypass feed paths 18. In some cases, the UPS controller 16 may cycle the bypass feed paths 18 to be switched off to balance the degree of stress applied to each bypass feed path 18 of the parallel UPS system 10.

Since the bypass feed paths 18 may not all be on or off at the same time, the condition of the thyristors of the SSMs of the bypass feed paths 18 may be analyzed for possible failures. Indeed, rather than merely relying on techniques based on load sharing, the UPS controller 16 may consider a variety of failure modes depending on whether the bypass feed path 18 is currently switched on or off. These various modes will be described in greater detail below. Indeed, in many cases the UPS controller 16 may consider whether a component of a bypass feed path 18 of each UPS 12 has failed individually, without relying on measurements from other UPSs 12, as in the case of determining failure based on load sharing.

Figure 2:
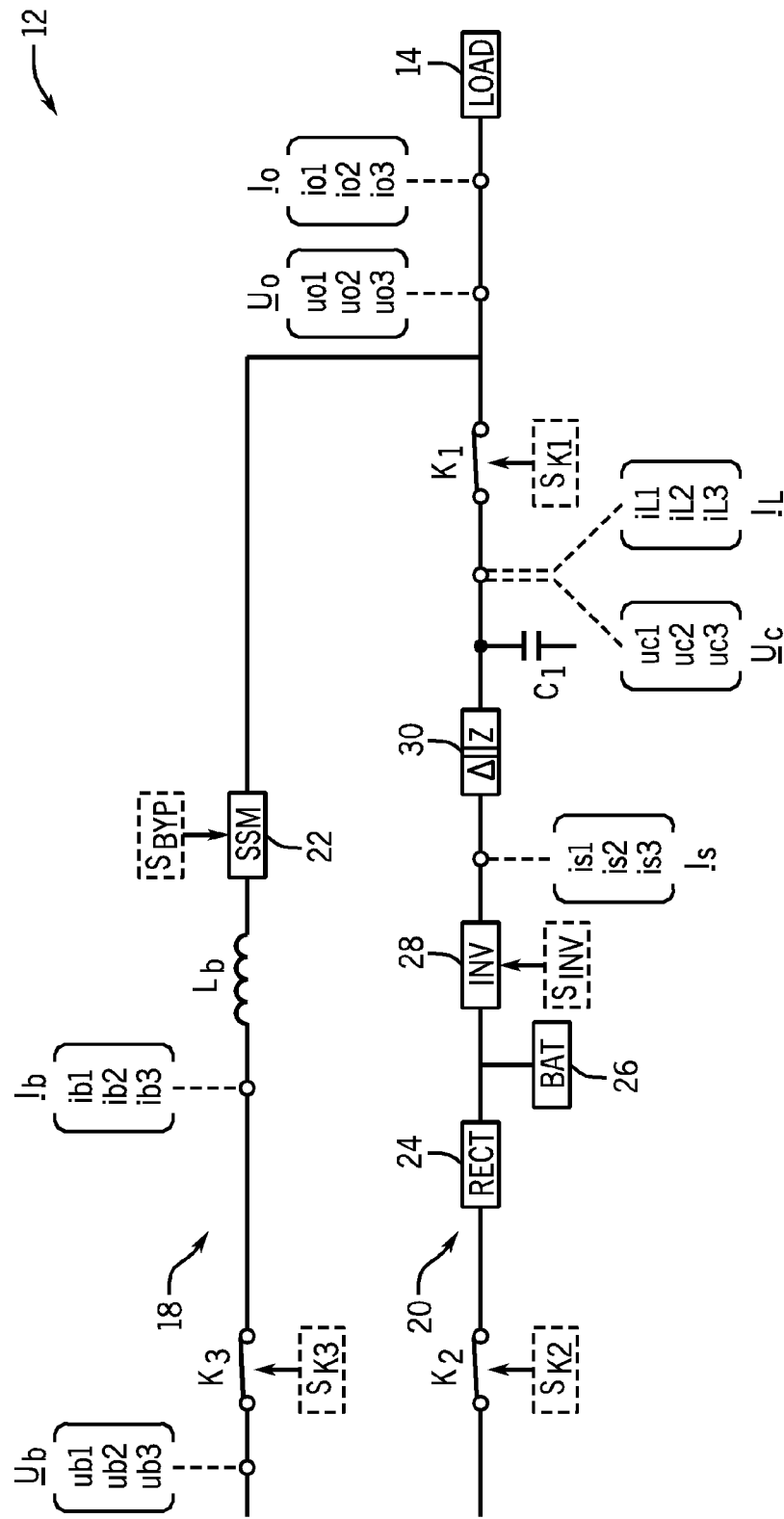
FIG. 2 is a one-line block diagram illustrating a system for controlling a UPS in the parallel UPS system, in accordance with an embodiment.

To control each UPS 12, the UPS controller 16 may receive electrical measurements at various points within the UPS 12 and provide several control signals to components of the UPS 12. Some of these signals are shown in a block diagram of a UPS 12 illustrated in FIG. 2. In the example of FIG. 2, a block diagram of a UPS 12 is shown in one-line form. That is, each line of the block diagram of FIG. 2 represents three phases of power (and/or a neutral line). As also can be seen in FIG. 2, the UPS 12 includes a bypass feed path 18 and an inverter feed path 20.

Referring first to the bypass feed path 18, a contactor or switch $k_3$ provides power from the power source through the bypass feed path 18 when closed. A control signal $S_{K3}$ from the UPS controller 16 may control whether the contactor or switch $K_3$ is open or closed. In general, the contactor or switch $K_3$ remains closed even when the bypass feed path 18 is not selected to provide power to the load 14. An inductor $L_b$ serves as a choke in each UPS 12. The presence of the inductor $L_b$ in the bypass feed path 18 may permit accurate electrical measurements in the bypass feed path 18 even when connected in parallel with other UPSs 12. As shown in FIG. 2, voltage measurements ($U_b$) and current measurements ($I_b$) of the bypass feed path 18 may be measured before the inductor $L_b$. Without the inductor $L_b$, a failure (e.g., a short circuit) in a different parallel bypass feed path 18 could immediately impact the measurements of the bypass feed path 18 shown in FIG. 2. Thus, when a failure occurs in one of multiple parallel bypass feed paths 18, the inductor $L_b$ may allow the UPS controller 16 to distinguish which of the multiple parallel bypass feed paths 18 has failed. It should be noted, however, that the bypass choke inductor $L_b$ may simply represent a 1% inductor; as such, the inductor $L_b$ may only loosely decouple the input and output of the bypass feed path 18. In case of a failure, both input and output measurements would still be affected, albeit somewhat less than otherwise, even using the inductor $L_b$. A static switch module (SSM) 22 in the bypass feed path 18 may act as a switch controlled by the UPS controller 16 (e.g., via a control signal $S_{BYP}$). As should be appreciated, the SSM 22 may be formed from cost- and power-efficient thyristors. The UPS controller 16 may control whether the bypass feed path 18 supplies power to the load 14 by toggling the SSM via the control signal $S_{BYP}$.

The inverter feed path 20 may receive power through a contactor or switch $K_2$. The UPS controller 16 may control the contactor or switch $K_2$ via a control signal $S_{K2}$. In general, the contactor or switch $K_2$ will remain closed even when the inverter feed path 20 is not selected to provide power to the load 14. Three-phase power passing through the inverter feed path 20 may enter a rectifier 24. The rectifier 24 converts alternating current (AC) power into direct current (DC) power. The DC power output by the rectifier 24 may be stored in a battery 26 or any other suitable energy storage device. When the inverter feed path 20 supplies power to the load 14, an inverter 28 may reconvert the DC power from the rectifier 24 and/or the battery 26 back to AC power based on inverter control signals $S_{INV}$. The UPS controller 16 may control whether the inverter feed path 20 supplies power to the load 14 based on the inverter control signals $S_{INV}$ the inverter 28 receives (or does not receive).

The AC power output by the inverter 28 may enter an output isolation transformer 30 before reaching one or more banks of filtering capacitors $C_1$. A contactor or switch $K_1$, controlled via a control signal $S_{k1}$, generally may remain closed. Indeed, in certain modes of operation, the contactor or switch $K_1$ may remain closed even when the load 14 is being supplied by the bypass feed path 18 and the inverter 28 is not active. As a result, some power from the bypass feed path 18 may flow back into the inverter feed path 20 through the contactor or switch $K_1$, thereby keeping the transformer 30 magnetized. By keeping the transformer 30 magnetized while the bypass feed path 18 is supplying power to the load 14, the inverter feed path 20 may be able to rapidly transition to supply power to the load 14. That is, the UPS controller 16 may quickly activate the inverter 28 without waiting for the transformer 30 to become magnetized.

As discussed above, the controller 16 may receive several electrical measurements of the UPS 12. For example, voltage measurements ($U_b$) and current measurements ($I_b$) of the bypass feed path 18 may be measured before the contactor $K_3$. In the inverter feed path 20, output currents ($I_s$) from the inverter 28 are sensed between the inverter 28 and the output isolation transformer 30. Additionally, capacitor voltage ($U_c$) and inverter load current ($I_L$) may be measured before the contactor or switch $K_1$. Finally, at the output of the UPS 12, amounting to the combination of power from the bypass feed path 18 and the inverter feed path 20, output voltage ($U_o$) and output current ($I_o$) may be measured. It should be understood that these measurements are provided by example and that more or fewer measurements may be obtained. To provide one brief example, in certain embodiments, measurements related to current through the banks of filtering capacitors $C_1$ may be obtained.

Figure 3:
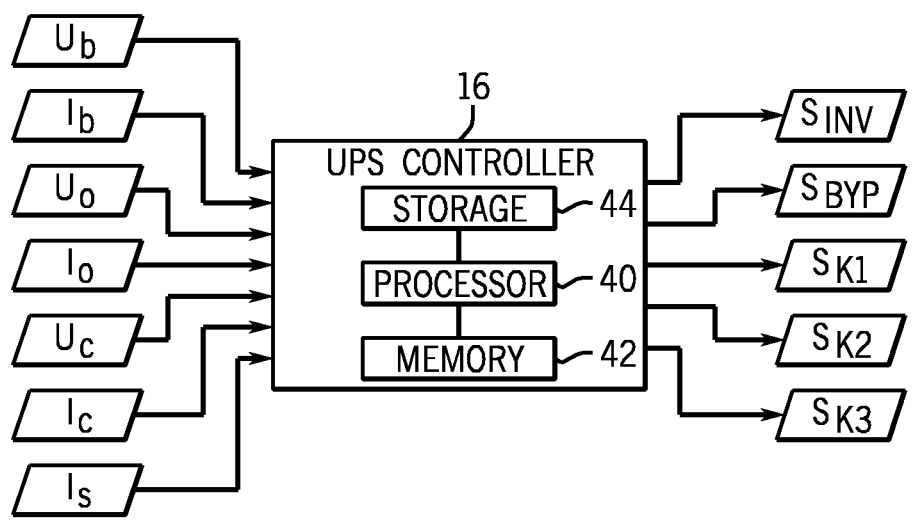
FIG. 3 is a block diagram of a UPS controller that may control a UPS of the parallel UPS system, in accordance with an embodiment.

As seen in FIG. 3, the UPS controller 16 may receive these measurements $U_b$, $I_b$, $U_o$, $I_o$, $U_c$, $I_L$, and $I_s$. Using these measurements, the UPS controller 16 may determine and/or output the UPS 12 control signals $S_{INV}$, $S_{BYP}$, $S_{K1}$, $S_{K2}$, and $S_{K3}$. To determine the control signals, the UPS controller 16 may employ a processor 40 operably coupled to memory 42 and/or storage 44. The processor 40 and/or other data processing circuitry may carry out instructions stored on any suitable article of manufacture having one or more tangible, machine-readable media at least collectively storing such instructions. The memory 42 and/or storage 44 may represent such articles of manufacture. Among other things, the memory 42 and/or the storage 44 may represent random-access memory, read-only memory, rewriteable memory, a hard drive, or optical discs. Additionally or alternatively, the UPS controller 16 may include a field programmable gate array (FPGA) or an application-specific integrated circuit (ASIC) that has been programmed to carry out the techniques discussed herein or to support the processor 40 (e.g., by assisting in communication).

Figure 4:
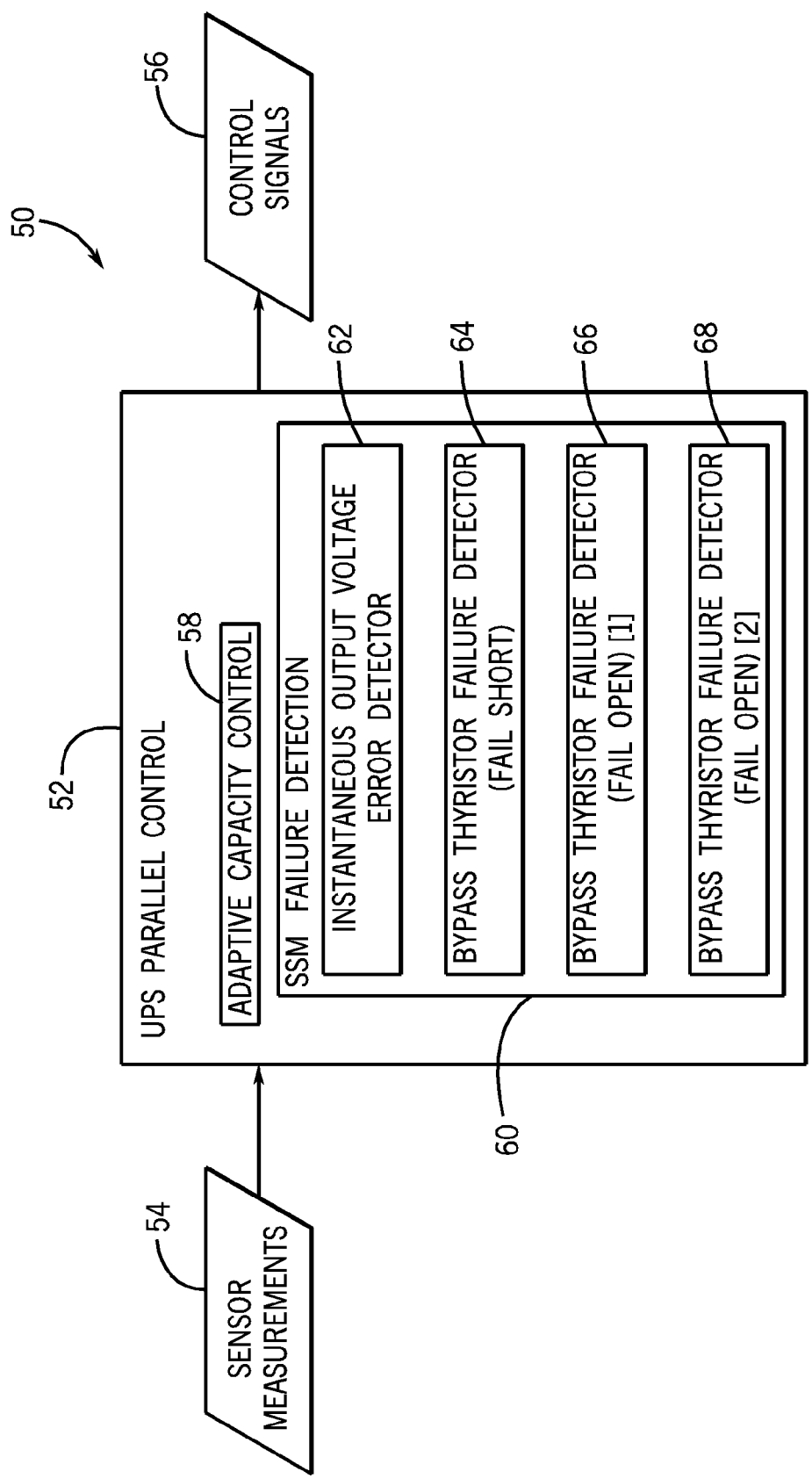
FIG. 4 is a block diagram of a control scheme carried out by the controller of FIG. 3, in accordance with an embodiment.

The UPS controller 16 may control the parallel UPSs 12 to increase efficiency by switching off unnecessary bypass feed paths 18 while also improving protection by monitoring more carefully thyristor failures in the SSMs 22. By way of example, the UPS controller 16 may run a parallel UPS control system 50, as generally illustrated in FIG. 4. The parallel UPS control system 50 may include a primary UPS control component 52 that receives sensor measurements 54 (e.g., $U_b, I_b, U_o, I_o, U_c, I_L$, and $I_s$) associated with the various UPSs 12 of the parallel UPS system 10. The UPS parallel control component 52 may output control signals 56 that may indicate when various UPS modules 12 are to be switched on or off. The parallel control component 52 may include, among other things, an adaptive capacity control component 58 and an SSM failure detection component 60. That is, although the parallel control component 52 is illustrated as including only the adaptive capacity control component 58 and the SSM failure detection component 60, other components that perform other control functions related to parallel control may be included.

The adaptive capacity control component 58 generally may allow the parallel UPS system 10 to operate using as few UPSs 12 as allowable given the current load 14. Additionally, the adaptive capacity control component 58 may cycle through which of the bypass feed paths 18 are switched on and off. The SSM failure detection component 60 may identify thyristor failures in the SSMs 22 of the bypass feed paths 18 at various times when the bypass feed paths 18 are switched on or switched off. It may be appreciated that, because the adaptive capacity control component 58 may cycle through which of the bypass feed paths 18 are switched on or off, the SSM failure detection component 60 may variously be able to identify failures in different bypass feed paths 18 at different times.

The SSM failure detection component 60 may detect a variety of possible thyristor failures. For example, an instantaneous output voltage error detector component 62 may detect a failure of an SSM 22 in a bypass feed path 18 that is currently on by detecting an output voltage error. A bypass thyristor failure detector (fail short) component 64 may detect when an SSM 22 in a bypass feed path 18 that has been switched off by the adaptive capacity control component 58 has short-circuited. A first bypass thyristor failure detector (fail open) component 66 may determine the failure of an SSM 22 that has been switched on using direct current (DC) values of currents through the bypass feed path 18. A second bypass thyristor failure detector (fail open) component 68 may identify a failure of an SSM 22 based on the RMS of bypass currents falling below a threshold.

The adaptive capacity control component 58 and the SSM failure detection component 60 may run periodically. Indeed, in some embodiments, the adaptive capacity control and the detection of thyristor failures in SSMs 22 may be understood to take place in real time or near real time. It should be appreciated that the parallel UPS control component 52 may have additional components than only the adaptive capacity control component 58 and the SSM failure detection component 60 illustrated in FIG. 4. Moreover, the SSM failure detection component 60 may have more or fewer components than those illustrated in FIG. 4.

The adaptive capacity control component 58 may improve the efficiency of the parallel UPS system 10 while allowing the SSM failure detection component 60 to identify additional failures. Specifically, the adaptive capacity control component 58 may ascertain an appropriate number of bypass feed paths 18 to keep active at a given time, given the current constraints of the load 14. Because some of the bypass feed path 18 will be controlled to be on and some may be occasionally controlled to be off, different types of possible failures of the SSMs 22 may be detected at different times.

Figure 5:
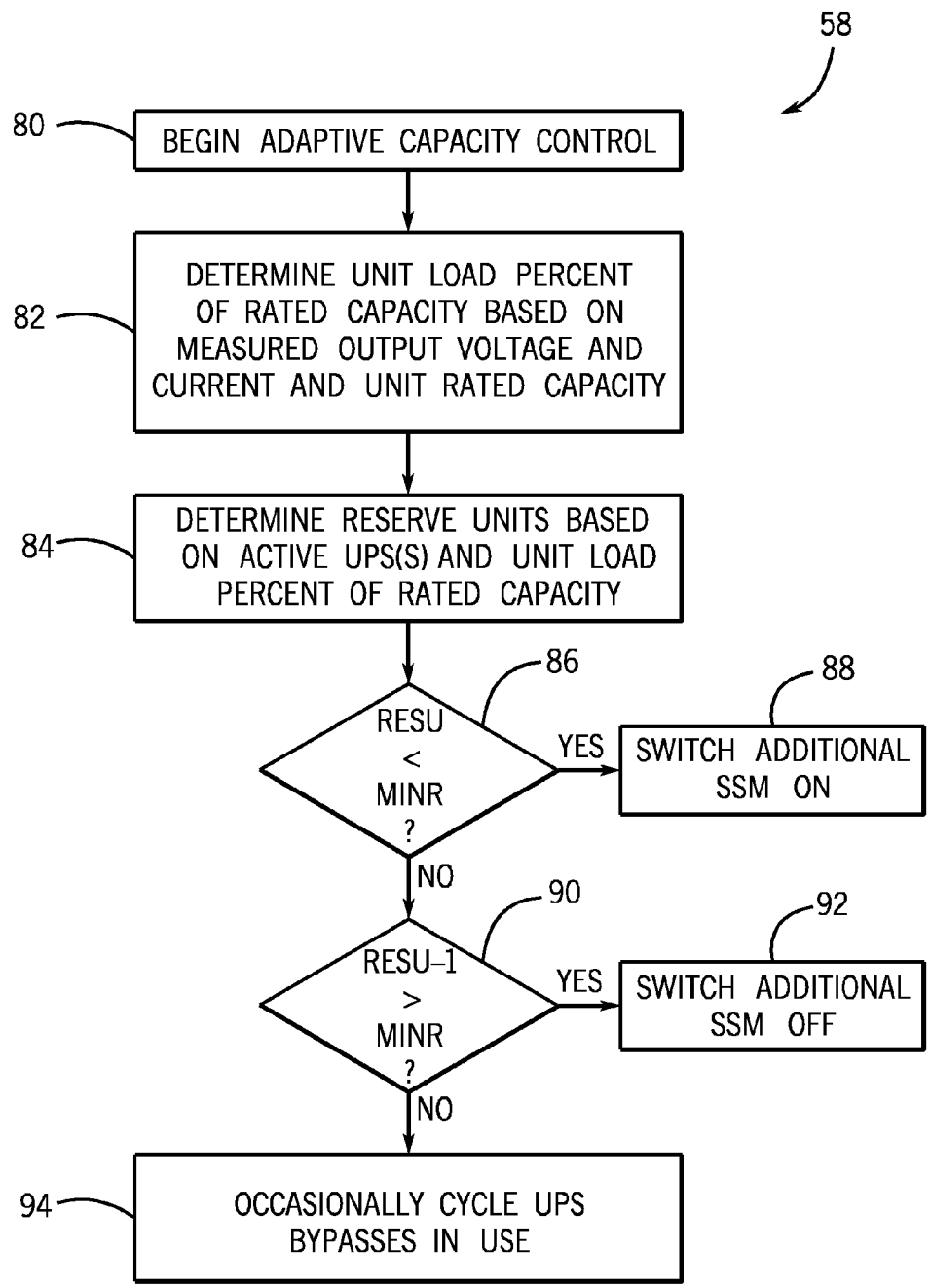
FIG. 5 is a flowchart describing a method for adaptive capacity control to switch some of the parallel UPSs on or off, in accordance with an embodiment.

One example of the adaptive capacity control component 58 appears as a flowchart in FIG. 5. When the adaptive capacity control component 58 begins (block 80), the unit load percent $L_{unit}\%$ of each UPS 12 may be determined based on the rated capacity $Unit_{kVA}$ of each UPS 12 and the measured output voltage $U_o$ and output current $I_o$ (block 82). From the unit load percent $L_{unit}\%$ of each UPS 12, the UPS controller 16 may determine available reserve units based on the total number Nb of available UPSs 12 in the parallel UPS system 10 (block 84). For example, the UPS controller 16 may ascertain the number of reserve units (RESU) according to the expression $Nb \times (1-L_{unit}\%)$. It may be noted that, since the various bypass feed paths 18 may have different ratings, the number of reserve units RESU may depend on these differing values.

When the number of reserve units (RESU) are less than the minimum number of reserve units (MINR) required to supply power to the load 14 (decision block 86), an additional SSM 22 may be switched on (block 88). Thus, an additional bypass feed path 18 may be activated to provide additional capacity. Otherwise, when the number of reserve units (RESU) is greater than the number of minimum reserve units (MINR) plus 1 (decision block 90), one of the bypass feed paths 18 may be unnecessary. Thus, the UPS controller 16 may switch off one of the SSMs 22 to reduce the number of bypass feed paths 18 supply power to the load 14 (block 92).

If the reserve units (RESU) are not beneath the number of minimum reserve units (MINR) (decision block 86) and also not greater than one more than the minimum reserve units (MINR) (decision block 90), the number of bypass feed paths 18 currently supplying power to the load 14 is neither too great nor too small. Thus, the same number of bypass feed paths 18 may be left active. Still, to evenly distribute wear on the UPSs 12 of the parallel UPS system 10, the adaptive capacity control component 58 may occasionally cycle which UPS bypass feed paths 18 are currently in use (block 94). That is, the UPS controller 16 may occasionally switch off bypass feed paths 18 that are on and may switch off bypass feed paths 18 that are off. To do so, the UPS controller 16 may employ any suitable wear leveling technique.

Figure 6:
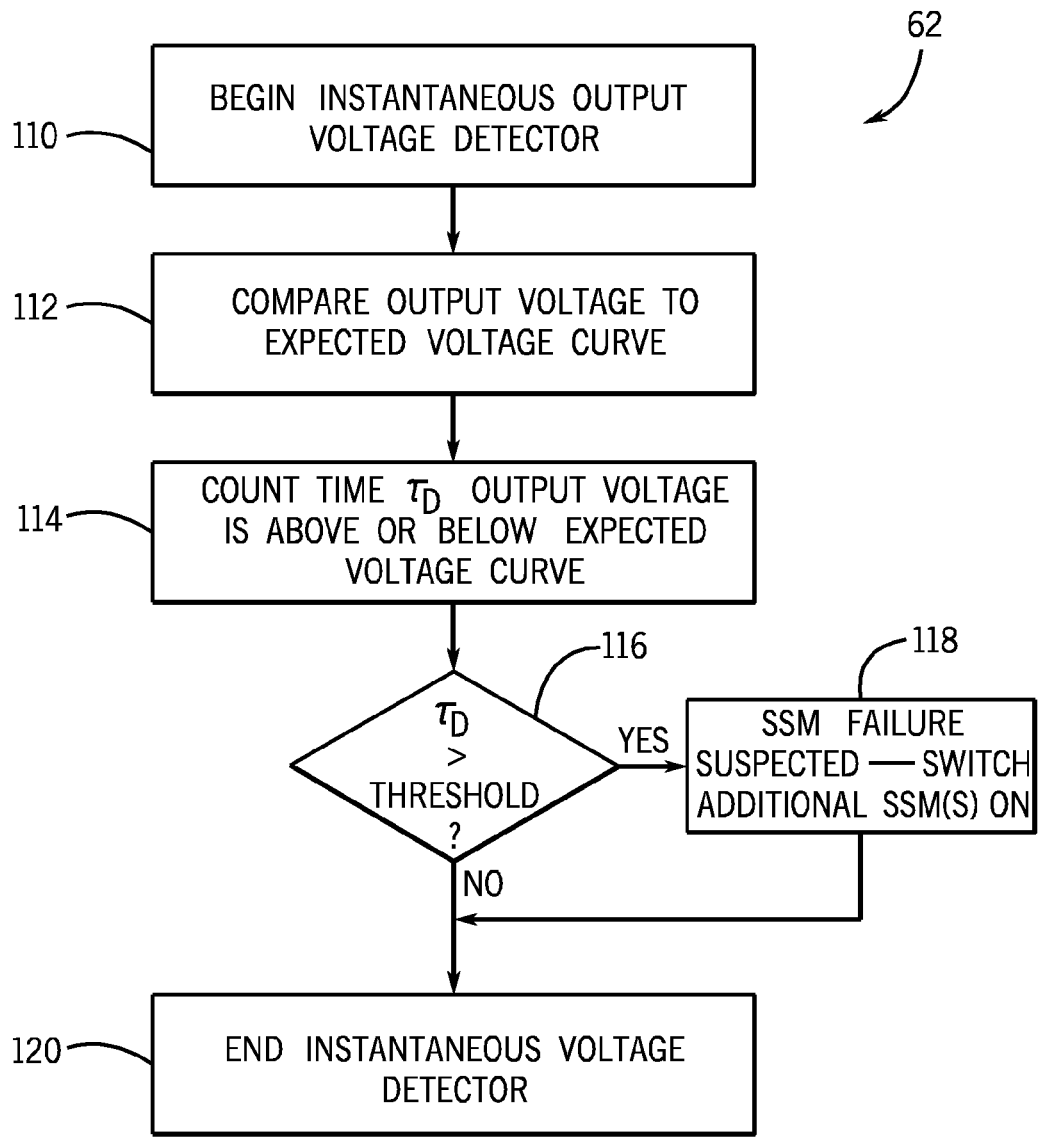
FIG. 6 is a flowchart describing a method for carrying out an instantaneous output voltage detection component of the control scheme of FIG. 4, in accordance with an embodiment.

In addition, a bypass feed path 18 may be switched on or off when a failure of an SSM 22 is identified. For example, as generally described in a flowchart of FIG. 6, the instantaneous output voltage error detector component 62 may identify when instantaneous output voltage errors indicate an SSM 22 has failed. The flowchart shown in FIG. 6 represents one manner of carrying out the instantaneous output voltage detector component 62. When the instantaneous output voltage detector component 62 begins (block 110), an output voltage associated with each phase (e.g., $u_1$, $u_2$, or $u_3$) may be compared to respective expected voltage curves (block 112). When the output voltage falls above or below thresholds around the expected voltage curve, the UPS controller 16 may count an amount of time $\tau_D$ (block 114). When the count time $\tau_D$ exceeds some threshold (decision block 116), a failure of the SSM 22 may be suspected (block 118). Under such conditions, one or more additional SSM(s) 22 may be switched on to insure sufficient power is supplied to the load 14 and/or an alarm or alert may be generated. Thereafter, or while the count timer $\tau_D$ does not exceed the threshold (decision block 116), the UPS controller 16 may end the instantaneous output voltage detector component 62 (block 120).

Figure 7:
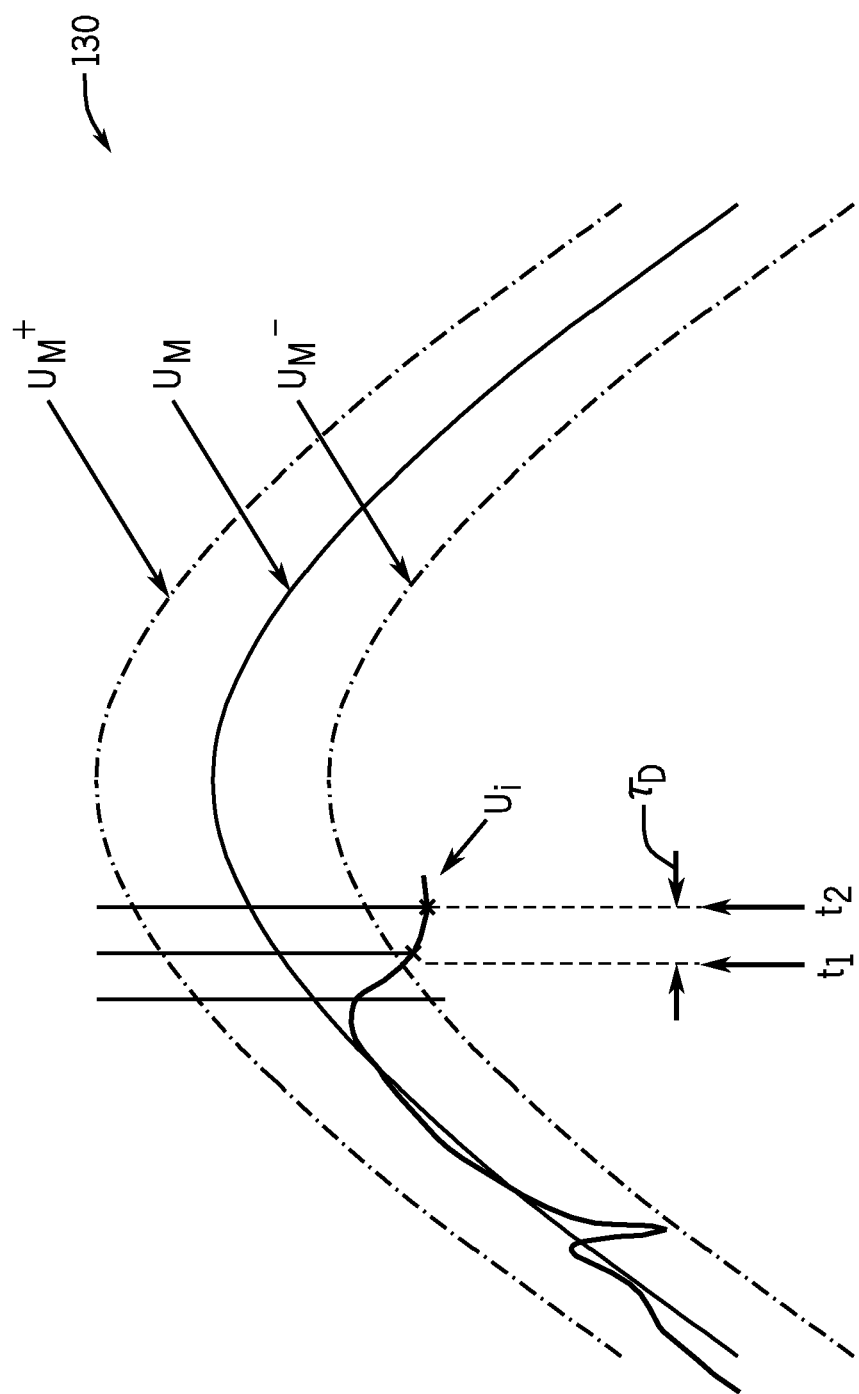
FIG. 7 is a plot providing an example of the operation of the instantaneous output voltage detector component, in accordance with an embodiment.

One example of the instantaneous output voltage error detector component 62 in operation appears in an instantaneous voltage diagram 130 of FIG. 7. In the instantaneous voltage diagram 130, an instantaneous voltage $u_i$ of one of the three-phases of a bypass feed path 18 is mapped over an expected voltage curve $u_M$, which is bounded by voltage thresholds $u_{M-}$ and $u_{M+}$. As long as the instantaneous output voltage $u_i$ remains within the thresholds (e.g., $u_{M+}$ and $u_{M-}$), no instantaneous output voltage error is occurring. When the instantaneous output voltage $u_i$ falls above the upper threshold (e.g., $u_{M+}$) or below the lower threshold (e.g., $u_{M-}$), the controller 16 may begin a count of a time $\tau_D$. Here, at sampling times T1 and T2, the instantaneous output voltage $u_i$ is beneath the lower threshold $u_{M-}$. Thus, as of the end of the voltage sampling illustrated in FIG. 7, the count time $\tau_D$ is the difference between T2 and T1. When the count time $\tau_D$ exceeds some threshold, an instantaneous output voltage error may be detected, as generally discussed above.

Figure 8:
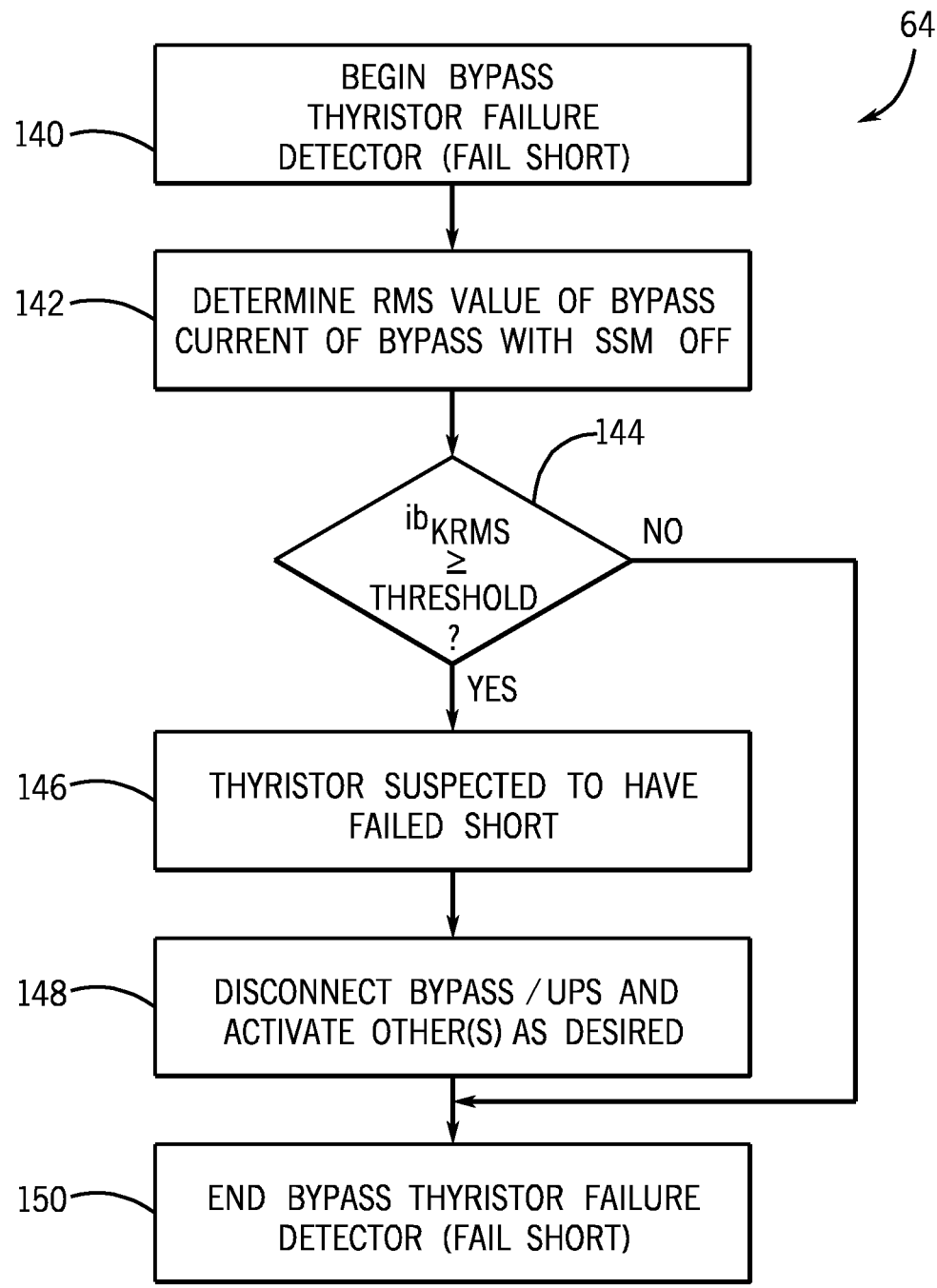
FIG. 8 is a flowchart describing a method for carrying out a bypass thyristor failure detector (fail short) component, in accordance with an embodiment.

When the adaptive capacity control component 58 has switched off a bypass feed path 18, the SSM 22 associated with the bypass feed path 18 should be off. The bypass thyristor failure detector (fail short) component 64, as generally described by a flowchart in FIG. 8, may detect when such an SSM 22 has failed short and instead remains at least partially on. When the UPS controller 16 begins to carry out the bypass thyristor failure detector (fail short) component 64 (block 140), the UPS controller 16 may determine a root mean square (RMS) value of the bypass current $ib_{kRMS}$ of a bypass feed path 18 whose SSM 22 is currently off, where k denotes the phase (e.g., 1, 2, or 3) (block 142). To do so, the UPS controller 16 may conduct a sliding RMS computation using instantaneous and historical values of the output voltage $U_o$ (e.g., every 100 or 200 μs or so).

When the RMS current $ib_{kRMS}$ of the bypass feed path 18 exceeds some threshold value (decision block 144), at least one of the thyristors of the SSM 22 may suspected to have failed short (block 146). As such, the UPS controller 16 may disconnect the bypass feed path 18 and/or the UPS 12 to which the bypass feed path 18 belongs (block 148). Additionally or alternatively, the UPS controller 16 may activate other bypass feed paths 18 and/or other UPSs 12 as desired, and may issue a corresponding alarm or alert. Thereafter, or if the RMS current $ib_{kRMS}$ of the bypass feed path 18 does not exceed the threshold (decision block 144), the UPS controller 16 may end the bypass thyristor failure detector (fail short) component 64 (block 150).

Figure 9:
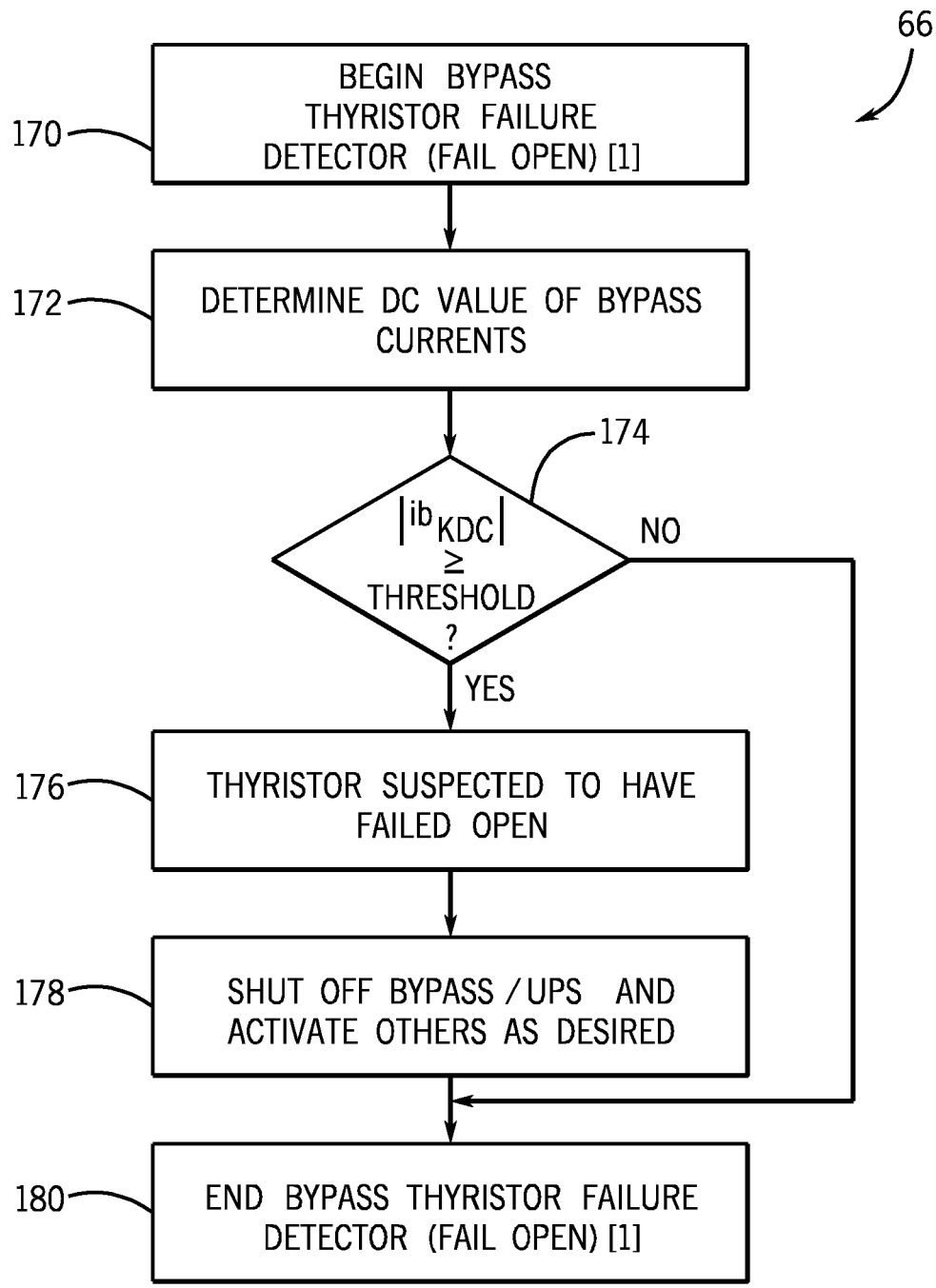
FIG. 9 is a flowchart describing a method for carrying out a first bypass failure detector (fail open) component, in accordance with an embodiment.

FIG. 9 represents one manner of carrying out the first bypass thyristor failure detector (fail open) component 66. As noted briefly above, the first bypass thyristor failure detector (fail open) component 66 may involve determining when a thyristor of an SSM 22 has failed open when the SSM 22 is suppose to be on. As shown in the flowchart of FIG. 9, the UPS controller 16 may begin the first bypass thyristor failure detector (fail open) component 66 (block 170) by determining direct current (DC) values of bypass currents (e.g., $i_{b1}$, $i_{b2}$, and $i_{b3}$) (block 172). The bypass currents $ib_k$ may be passed through any suitable low pass filters (LPFs) to determine the DC values of the bypass currents $ib_{kDC}$.

When the absolute value of the DC value of the bypass currents $|ib_{KDC}|$ is exceeds some threshold, it may be understood that the thyristor of the phase of the bypass feed path 18 where these conditions occurred has likely failed open (block 176). Thus, the UPS controller 16 may shut off the bypass feed path 18 and/or the UPS 12 with the SSM 22 with the failed thyristor (block 178). Additionally, the UPS controller 16 may also cause other bypass feed paths 18 and/or other UPSs 12 to be activated as desired. Thereafter, or if the DC value of the bypass currents $|ib_{KDC}|$ is not greater than or equal to the threshold (decision block 174), the UPS controller may end the first bypass thyristor failure detector (fail open) component 66 (block 180).

Figure 10:
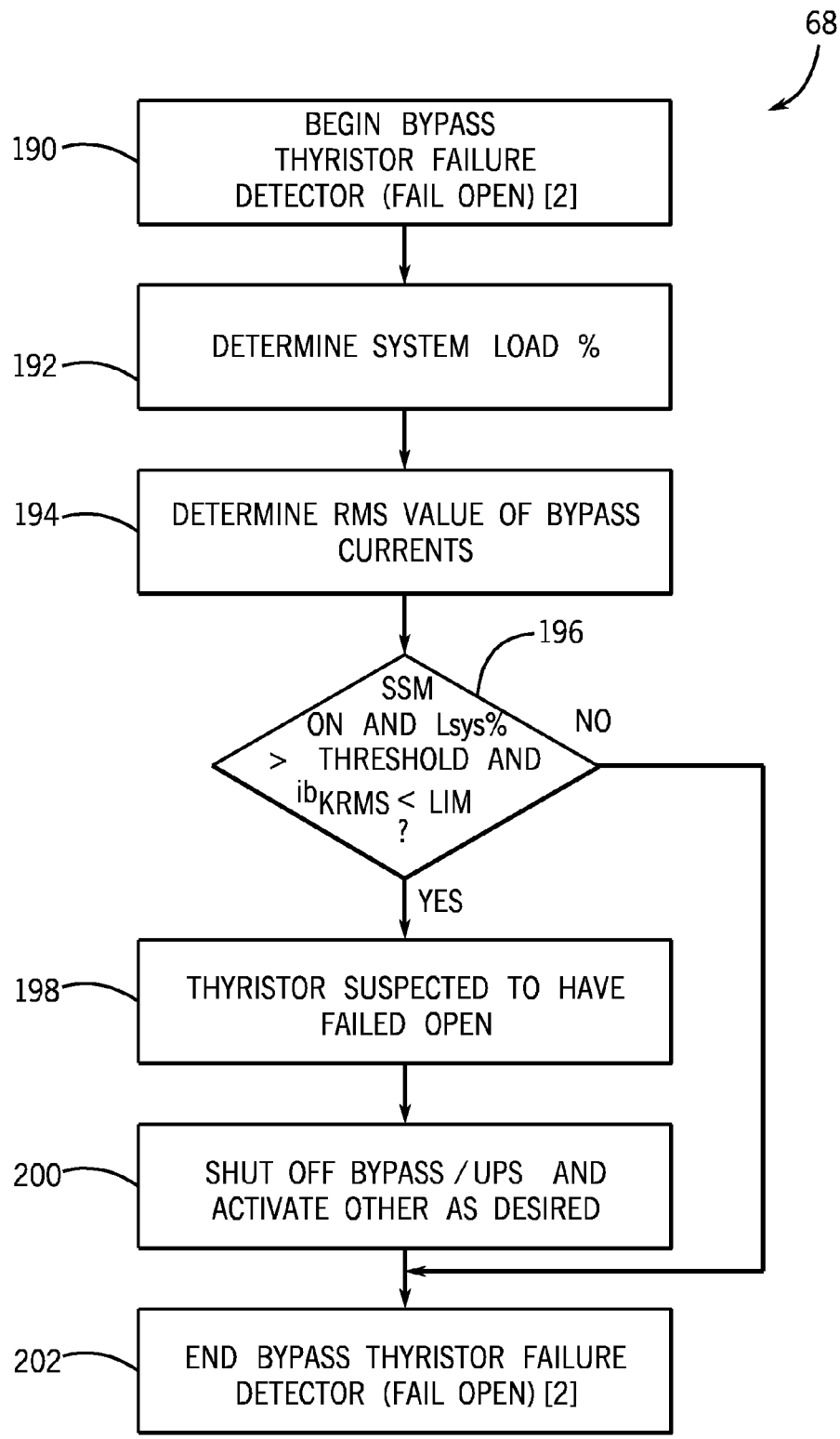
FIG. 10 is a flowchart describing a method for carrying out a second bypass thyristor failure detector (fail open) component, in accordance with an embodiment.

The second bypass thyristor failure detector (fail open) component 68 may represent an alternative manner of the detecting potential fail-open conditions in an SSM 22. The UPS controller 16 thus may employ the first bypass thyristor failure detector (fail open) component 66, the second bypass thyristor failure detector (fail open) component 68, or both. One manner of carrying out the second bypass thyristor failure detector (fail open) component 68 appears in a flowchart of FIG. 10. As seen in FIG. 10, when the UPS controller 16 begins the second bypass thyristor failure detector (fail open) component 68 (block 190), the UPS controller 16 first may determine the system load percent Lsys % associated with the entire parallel UPS system 10 (block 192). By way of example, the UPS controller 16 may do so based on the capacity of the parallel UPS system 10 (e.g., the total kVA capacity) and the output voltages and currents. Here, it may be noted that the one limitation of the second bypass thyristor failure detector (fail open) component 68 may be that it may require the system load percent Lsys % to exceed some threshold. That is, the UPS controller 16 may not permit operation in a high-efficiency power-saving mode unless the system load level is high enough to warrant the additional power savings. In this context, enabling such a power-saving mode only after the system load percent Lsys % is higher than the threshold may facilitate an opportunity to perform reliable thyristor failure detection via the second bypass thyristor failure detector (fail open) component 68.

Accordingly, the UPS controller 16 may also determine root mean square (RMS) values of the bypass current $ib_{kRMS}$ (block 194). When the SSM 22 of the bypass feed path 18 being analyzed in the second bypass thyristor failure detector (fail open) component 68 is on, the system load percent (Lsys %) is greater than some threshold, and the RMS current through the phase of the bypass feed path $ib_{kRMS}$ is less than some limit (decision block 196), a thyristor of the bypass feed path 18 may be suspected to have failed open (block 198). As such, the UPS controller 16 may shut off the bypass feed path 18 and/or the UPS 12 associated with the bypass feed path 18 (block 200). Additionally or alternatively, the UPS controller 16 may cause other bypass feed paths 18 and/or other UPSs 12 to be activated as desired. Thereafter, or if the circumstances of the decision block 196 are not satisfied, the UPS controller 16 may end the second bypass thyristor failure detector (fail open) component 68 (block 202).

The second bypass thyristor failure detector (fail open) component 68 may also indicate a failure of another device in a bypass feed path 18. For instance, upon activation of the second bypass thyristor failure detector (fail open) component 68 due to a possible disturbance, it is possible that the possible disturbance may have arisen due to a failure in the SSM 22 (e.g., a pair of antiparallel thyristors not in conduction) or from a failure in the bypass feed path 18 input voltage, depending on the bypass input voltage Ub being in or out of tolerances, respectively. Therefore, in case of activation of the second bypass thyristor failure detector (fail open) component 68, the UPS controller 16 may force open the contactor or switch $K_3$ and further discriminate between the two failures by comparing the bypass voltage RMS with specified thresholds.

Technical effects of the present disclosure include, among other things, reducing uninterruptible power supply (UPS) losses through adaptive capacity control in a parallel UPS system. Moreover, operation provided through such adaptive capacity control may extend lifetime of thyristors used in static switch modules of the parallel UPS system. Moreover, the adaptive capacity control may permit certain advanced diagnostic thyristor failure detection. This advanced thyristor failure detection may provide improved reliability of parallel UPS systems. In addition, a failure of a component in a bypass feed path of a UPS may be determined without need to consider load sharing—indeed, a UPS controller may be able to determine a failure without measurements from all other UPS modules in many instances.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A parallel uninterruptible power supply (UPS) system comprising:
    a plurality of UPS modules to supply power to a load, at least a subset of the plurality of UPS modules comprising a respective bypass feed path configured to be switched on or off via a respective static switch module (SSM); and
    at least one controller to:
        adaptively control which of the plurality of bypass feed paths are switched on and off based at least in part on the load and respective capacity ratings of the UPS modules; and
        determine when an SSM of one of the bypass feed paths is likely to have failed.

2. The system of claim 1, wherein the controller is configured to determine when the SSM of the one of the bypass feed paths is likely to have failed without a load share determination.

3. The system of claim 1, wherein the controller is configured to control which of the plurality of bypass feed paths are switched on and off so as to cycle the plurality of bypass feed paths on and off to share the amount of stress across the plurality of bypass feed paths.

4. The system of claim 1, wherein the controller is configured to control which of the plurality of bypass feed paths are switched on and off such that each of the plurality of bypass feed paths is switched on approximately as often as the others.

5. The system of claim 1, wherein the controller is configured to determine when the SSM of the one of the bypass feed paths is likely to have failed by detecting an instantaneous output voltage error.

6. The system of claim 1, wherein the controller is configured to determine when the SSM of the one of the bypass feed paths is likely to have failed by detecting when a root mean square value of a current flowing through the one of the bypass feed paths exceeds a threshold.

7. The system of claim 6, wherein the controller is configured to test whether the root mean square value of the current flowing through the one of the bypass feed paths exceeds the threshold when controller has adaptively controlled the one of the bypass feed paths to be switched off.

8. The system of claim 1, wherein the controller is configured to determine when the SSM of the one of the bypass feed paths is likely to have failed by detecting when an absolute value of a direct current flowing through the one of the bypass feed paths exceeds a threshold.

9. The system of claim 8, wherein the controller is configured to test whether the direct current value of the current flowing through the one of the bypass feed paths exceeds the threshold when controller has adaptively controlled the one of the bypass feed paths to be switched on.

10. The system of claim 1, wherein the controller is configured to determine when the SSM of the one of the bypass feed paths is likely to have failed based at least in part on a relationship between a root mean square value of the current flowing through the one of the bypass feed paths and a total load level of the plurality of UPS modules.

11. A parallel uninterruptible power supply (UPS) system controller comprising:
    a memory configured to store electrical measurements associated with a plurality of UPS modules to supply power to a load, at least a subset of the plurality of UPS modules comprising a bypass feed path configured to be switched on or off via a static switch module (SSM); and
    data processing circuitry configured to execute an adaptive capacity control component of a parallel UPS control system and an SSM failure detection component of the parallel UPS control system, wherein the adaptive capacity control component is configured to adaptively control which of the plurality of bypass feed paths are switched on and off based at least in part on the load and respective capacity ratings of the UPS modules, and wherein the SSM failure detection component is configured to determine when an SSM of one of the bypass feed paths is likely to have failed based at least in part on a measurement of current through the one of the bypass feed paths.

12. The controller of claim 11, wherein the adaptive capacity control component is configured to determine a minimum number of UPS modules to satisfactorily supply power to the load and, when the number of currently active UPS modules exceeds the minimum number of UPS modules, to switch another of the plurality of bypass feed paths on.

13. The controller of claim 11, wherein the adaptive capacity control component is configured to determine a minimum number of UPS modules to satisfactorily supply power to the load and, when the number of currently active UPS modules is less than the minimum number of UPS modules, to switch another of the plurality of bypass feed paths off.

14. The controller of claim 11, wherein the adaptive capacity control component is configured to determine a minimum number of UPS modules to satisfactorily supply power to the load and, when the number of currently active UPS modules is approximately equal to the minimum number of UPS modules, to occasionally cycle different ones of the plurality of bypass feed paths off or on while keeping the number of currently active UPS modules substantially the same.

15. The controller of claim 11, wherein the SSM failure detection component comprises:
    an instantaneous output voltage error detector component configured to identify a failure of the SSM of the one of the bypass feed paths based at least in part on an instantaneous output voltage error;
    a bypass thyristor failure detector (fail short) component configured to identify a short-circuit condition of a thyristor of the SSM of the one of the bypass feed paths based at least in part on a root mean square current through the one of the bypass feed paths when the SSM has been controlled to be off;
    a first bypass thyristor failure detector (fail open) component configured to identify an open-circuit condition of a thyristor of the SSM of the one of the bypass feed paths based at least in part on a direct current through the one of the bypass feed paths when the SSM has been controlled to be on; or
    a second bypass thyristor failure detector (fail open) component configured to identify an open-circuit condition of a thyristor of the SSM of the one of the bypass feed paths based at least in part on a relationship between a root mean square value of the current flowing through the one of the bypass feed paths and a total load level of the parallel UPS system; or any combination thereof.

16. The controller of claim 15, wherein the instantaneous output voltage error detector component is configured to identify the failure of the SSM of the one of the bypass feed paths when an instantaneous output voltage of the one of the bypass feed paths varies from an ideal output voltage by a threshold amount of voltage for more than a threshold amount of time.

17. The controller of claim 15, wherein the bypass thyristor failure detector (fail short) component is configured to identify the short-circuit condition of the thyristor of the SSM of the one of the bypass feed paths by:
conducting a sliding root mean square computation or averaging multiple consecutive measurement periods, or both, to obtain the root mean square current using instantaneous and historical values of the current through the one of the bypass feed paths; and
when the root mean square current exceeds a threshold, indicating that the short-circuit condition of the thyristor of the SSM of the one of the bypass feed paths has or is likely to have occurred.

18. The controller of claim 15, wherein the first bypass thyristor failure detector (fail open) component is configured to identify the open-circuit condition of the thyristor of the SSM of the one of the bypass feed paths by:
low-pass-filtering instantaneous and historical values of the current through the one of the bypass feed paths to obtain the direct current through the one of the bypass feed paths; and
when an absolute value of the direct current through the one of the bypass feed paths exceeds a threshold, indicating that the open-circuit condition of the thyristor of the SSM of the one of the bypass feed paths has or is likely to have occurred.

19. An article of manufacture comprising:
one or more tangible, machine-readable media at least collectively comprising machine-executable instructions, the instructions comprising:
instructions to receive measurements of current through a bypass feed path of an uninterruptible power supply (UPS);
instructions to, when a static switch module (SSM) of the bypass feed path is supposed to be off:
determine a root mean square value of the current through the bypass feed path based at least in part on the measurements of current through the bypass feed path; and
determine whether a short-circuit failure condition of the SSM is likely to have occurred based at least in part on the root mean square current value; and
instructions to, when the SSM of the bypass feed path is supposed to be on:
determine a direct current value of the current through the bypass feed path based at least in part on the measurements of current through the bypass feed path; and
determine whether an open-circuit failure condition of the SSM is likely to have occurred based at least in part on the direct current value.

20. The article of manufacture of claim 19, comprising instructions to adaptively control which of a plurality of bypass feed paths of a plurality of UPS modules connected in parallel are switched on and off based at least in part on a total load being supplied and respective capacity ratings of the UPS modules so as to cycle the plurality of bypass feed paths on and off to share the amount of stress across the plurality of bypass feed paths.

21. The system of claim 1, wherein the controller comprises:
a memory configured to store electrical measurements associated with the plurality of UPS modules; and
data processing circuitry configured to execute an adaptive capacity control component and an SSM failure detection component, wherein the adaptive capacity control component is configured to adaptively control which of the plurality of bypass feed paths are switched on and off based at least in part on the load and respective capacity ratings of the UPS modules, and wherein the SSM failure detection component, and wherein the SSM failure detection component is configured to determine when the SSM of one of the bypass feed paths is likely to have failed based at least in part on a measurement of current through the one of the bypass feed paths.

22. The system of claim 1, wherein the controller comprises a processor and one or more tangible, machine-readable media at least collectively comprising machine-executable instructions configured to be executed on the processor, the instructions comprising:
instructions to receive measurements of current through the one of the plurality of bypass feed paths of the UPS;
instructions to, when the SSM of the one of the bypass feed paths is supposed to be off:
determine a root mean square value of the current through the bypass feed path based at least in part on the measurements of current through the bypass feed path; and
determine whether a short-circuit failure condition of the SSM is likely to have occurred based at least in part on the root mean square current value; and
instructions to, when the SSM of the one of the bypass feed paths is supposed to be on:
determine a direct current value of the current through the bypass feed path based at least in part on the measurements of current through the bypass feed path; and
determine whether an open-circuit failure condition of the SSM is likely to have occurred based at least in part on the direct current value.

23. The controller of claim 11, wherein the memory is configured to store machine-executable instructions, the instructions comprising:
instructions to receive measurements of current through the one of the plurality of bypass feed paths of the UPS;
instructions to, when the SSM of the one of the bypass feed paths is supposed to be off:
determine a root mean square value of the current through the bypass feed path based at least in part on the measurements of current through the bypass feed path; and
determine whether a short-circuit failure condition of the SSM is likely to have occurred based at least in part on the root mean square current value; and
instructions to, when the SSM of the one of the bypass feed paths is supposed to be on:
determine a direct current value of the current through the bypass feed path based at least in part on the measurements of current through the bypass feed path; and determine whether an open-circuit failure condition of the SSM is likely to have occurred based at least in part on the direct current value.

24. The article of manufacture of claim 19, wherein the article of manufacture comprises a memory device in a controller of a parallel uninterruptible power supply (UPS) system that includes a plurality of UPS modules to supply power to a load, at least a subset of the plurality of UPS modules comprising a respective bypass feed path configured to be switched on or off via a respective static switch module (SSM), wherein the controller is configured to adaptively control which of the plurality of bypass feed paths are switched on and off based at least in part on the load and respective capacity ratings of the UPS modules and determine when an SSM of one of the bypass feed paths is likely to have failed.

\* \* \* \* \*